United States Patent [19]

Prukop

[11] Patent Number: 5,092,405
[45] Date of Patent: Mar. 3, 1992

[54] ALKOXYLATED SURFACTANT SYSTEM FOR HEAVY OIL RESERVOIRS

[75] Inventor: Gabriel Prukop, Houston, Tex.
[73] Assignee: Texaco Inc., White Plains, N.Y.
[21] Appl. No.: 632,206
[22] Filed: Dec. 21, 1990
[51] Int. Cl.$^5$ .............................................. E21B 43/22
[52] U.S. Cl. .................... 166/272; 166/273; 166/274; 166/275; 252/8.554
[58] Field of Search ............... 166/272, 273, 274, 275, 166/303; 252/8.554

[56] References Cited

U.S. PATENT DOCUMENTS

| | | | |
|---|---|---|---|
| 4,016,932 | 4/1977 | Kalfoglou | 166/273 X |
| 4,120,358 | 10/1978 | Kalfoglou | 166/275 |
| 4,194,565 | 3/1980 | Kalfoglou | 166/275 |
| 4,269,271 | 5/1981 | Shupe et al. | 166/274 |
| 4,457,373 | 7/1984 | Balzer et al. | 166/274 |
| 4,507,211 | 3/1985 | Naylor et al. | 166/275 X |
| 4,582,138 | 4/1986 | Balzer | 166/273 |
| 4,971,707 | 11/1990 | Osterloh | 252/8.554 |

Primary Examiner—George A. Suchfield
Attorney, Agent, or Firm—Jack H. Park; Kenneth R. Priem; Harold J. Delhommer

[57] ABSTRACT

The invention is a method of recovering heavy oil from an underground reservoir by surfactant flooding which comprises injecting an aqueous surfactant solution comprising about 0.1% to about 5% by weight of an alkoxylated nonionic or ionic surfactant through an injection well into an underground reservoir containing a heavy oil having an average API gravity below about 20° and a reservoir temperature above about 150° F., where the alkoxylated surfactant must have sufficient alkylene oxide groups comprised of ethylene oxide or propylene oxide to have a cloud point above about 100° F. and below reservoir temperature, and to be water-soluble in the surfactant solution to be injected at a temperature below its cloud point, and have a sufficiently large hydrophobe to be soluble in the reservoir's heavy oil at a temperature equal to or greater than reservoir temperature.

15 Claims, 1 Drawing Sheet

ALKOXYLATED SURFACTANT SYSTEM FOR HEAVY OIL RESERVOIRS

BACKGROUND OF THE INVENTION

This invention relates to a surfactant flooding system for recovering heavy oil. More particularly, the invention concerns a surfactant system containing an alkoxylated surfactant which is water soluble at ambient temperature but has a large enough hydrophobe to be oil soluble at a reservoir temperature above its cloud point.

Surfactant flooding demands careful planning of the composition, concentration and salinity of the surfactant slug. Because the surfactant slugs must interact with the reservoir crude at reservoir conditions, a surfactant system is designed to have the lowest interfacial tension between water and oil at reservoir conditions. It is well-known in the art that the lowest interfacial tension possible with a surfactant system (and the best oil recovery) will occur if the surfactant system is designed to form a microemulsion with the reservoir crude at or near the mid-phase region of a three phase system called a Type III phase environment or regime.

An emulsion is a phase suspended in another immiscible phase, which may or may not be thermodynamic equilibrim. A microemulsion is a thermodynacically stable emulsion.

Microemulsions are generally classified as oil-in-water microemulsions, water-in-oil microemulsions, and middle phase microemulsions. An oil-in-water microemulsion is a microemulsion in which the external or continuous phase is water and the dispersed phase is oil. A surfactant-water mixture which forms an oil-in-water microemulsion can equilibrate as a single phase or as two phases such as a lower phase oil-in-water microemulsion plus an equilibrium upper phase of oil, depending on the overall composition of the mixture. Such mixtures are defined by those skilled in the art of surfactant flooding as existing in a Type II(−) phase environment.

A water-in-oil microemulsion is an microemulsion in which the external or continuous phase is oil and the dispersed phase is water. A surfactant-oil-water mixture which forms a water-in-oil microemulsion can equilibrate as a single phase or as two phases of an upper phase water-in-oil microemulsion plus an equilibrium lower phase of excess water depending on the overall composition of the mixture. Such mixtures are defined by those skilled in the art of surfactant flooding as existing a Type II(+) phase environment.

A middle phase microemulsion is an microemulsion in which there is apparently no identifiable external or continuous phase. A surfactant-oil-water mixture which forms a middle phase microemulsion can equilibrate as a single phase, as two phases of a middle phase microemulsion plus an equilibrium phase or excess oil or excess water, or as three phases. The three phases would be a middle phase microemulsion plus an equilibrium water phase and an equilibrium oil phase. The end result of the equilibrated microemulsion depends on the overall composition of the mixture. Such mixtures are defined by those skilled in the art of surfactant flooding as existing in Type III phase environments or regimes. It should be emphasized that the best oil recovery from surfactant flooding generally occurs when the surfactant slug and reservoir oil form a middle phase microemulsion in a Type III phase environment. This is the goal of surfactant system planning.

Heavy viscous oils present significant problems in the design of surfactant assisted floods. These problems are aggravated by the fact that most heavy oil fields in North America that are surfactant flood candidates have been steamflooded. Steamflooding insures that reservoir salinity will be very low, frequently of a lower salinity than most municipal water systems. This low salinity combined with the heavy oil makes it difficult to design a surfactant system which will form an microemulsion with the oil in the Type III regime where some oil and brine is solubilized in the mid-phase.

It is useful to describe two characteristics of surfactant phase behavior. At a fixed oil weight, temperature and surfactant composition, as salinity increases the phase regime changes from a Type II(−) where the surfactant is in water to a Type III where the surfactant is in the desirable mid-phase to a Type II(+) where the surfactant and some brine has moved into the oil phase. Consequently, in the low salinity environments of most heavy oil fields, particularly if they have been steamflooded, it is difficult to get out of a Type II(−) phase regime where the surfactant is in water to a Type III mid-phase.

A second characteristic of surfactant systems defines the role of oil in phase behavior. At a fixed salinity and surfactant composition, as the oil weight increases to a heavier crude with a higher equivalent alkane carbon number (EACN), the surfactant will move through the phase regimes in the opposite direction as increasing salinity. For a low EACN the mixture of surfactant, oil and water will be in a Type II(+) phase regime where the surfactant resides in the oil phase. As the EACN increases, the system will go through the mid-phase region of the Type III on its way to a Type II(−) phase regime with the surfactant in water for a high EACN or viscous oil.

Because of the two above relationships with increasing salinity and increasing oil weight, it is doubly difficult to design a surfactant system that will emulsify with the reservoir crude in the mid-phase of a Type III environment. The heavy weight of the reservoir crude will tend to exhibit Type II(−) phase behavior. The low salinity of such reservoirs also tends to force any resulting microemulsion of the surfactant, water and oil to be in a Type II(−) phase environment. In both cases, there is strong pressure forcing the surfactant into the water, making it difficult to solubilize the oil.

A third factor working against surfactant flooding of steamflooded reservoirs is the relatively high reservoir temperature. As the temperature of the reservoir increases, ionic surfactants become more water soluble and alkyoxylated nonionics become more oil soluble. Thus, high salt concentrations are required to attain the mid-phase with its minimum interfacial tension. For alkyl and alkylaryl surfactants, this effect of temperature on interfacial tension is small but indicative of increasing surfactant solubility in water with increasing temperature. The low salinity brine of steamflooded reservoirs, however, runs counter to the extra salinity needed at higher temperatures.

Another complicating factor in the surfactant flooding of heavy oil reservoirs is that it is more difficult to solubilize a heavy viscous oil than it is to emulsify a light oil. For heavy oil with a high EACN, a surfactant is required with a large hydrophobe. Most surfactants with large hydrophobes are not water soluble. As a result, another difficulty arises in solubilizing the surfactant or multiple surfactants in an aqueous solution for initial injection. There will almost always be injection problems associated with a system that is oil soluble but not water soluble.

It is for these reasons that surfactant flooding of heavy oil reservoirs, particularly those that have been steamflooded, is virtually unknown in the art. Some discussion of these issues can be found in Ziegler, V. M., "Laboratory Investigation of High Temperature Surfactant Flooding," Society of Petroleum Engineers Journal, May 1988, pp. 587-596. Unfortunately, the reference offered no acceptable solution in its discussion of the possible flooding of heavy oil from a Kern River reservoir which had been steamflooded. Ziegler had two answers. First, he used a 10% saline preflush for every test. This high salinity was needed to force the surfactant to be more oil soluble. Second, he dropped the salinity of his surfactant slugs to facilitate handling and injection, but this sacrificed optimum surfactant performance. The dual use of the high brine preflush and brine with the surfactant slug would be adequate in a reservoir.

SUMMARY OF THE INVENTION

The invention is a method of recovering heavy oil from an underground reservoir by surfactant flooding which comprises injecting an aqueous surfactant solution comprising about 0.1% to about 5% by weight of an alkoxylated nonionic or ionic surfactant through an injection well into an underground reservoir containing a heavy oil having an average API gravity below about 20° and a reservoir temperature above about 150° F. The alkoxylated surfactant must have sufficient alkylene oxide groups comprised of ethylene oxide or propylene oxide to have a cloud point above about 100° F. and below reservoir temperature, and to be water-soluble in the surfactant solution to be injected at a temperature below its cloud point. The alkoxylated surfactant must also have a sufficiently large hydrophobe to strongly interact with the reservoir's heavy oil at a temperature equal to or greater that reservoir temperature.

After the injection of the surfactant solution, and aqueous drive fluid is injected into the reservoir to drive the surfactant solution towards a production well. Oil and other fluids are recovered through one or more production wells.

DETAILED DESCRIPTION

Figure 1:
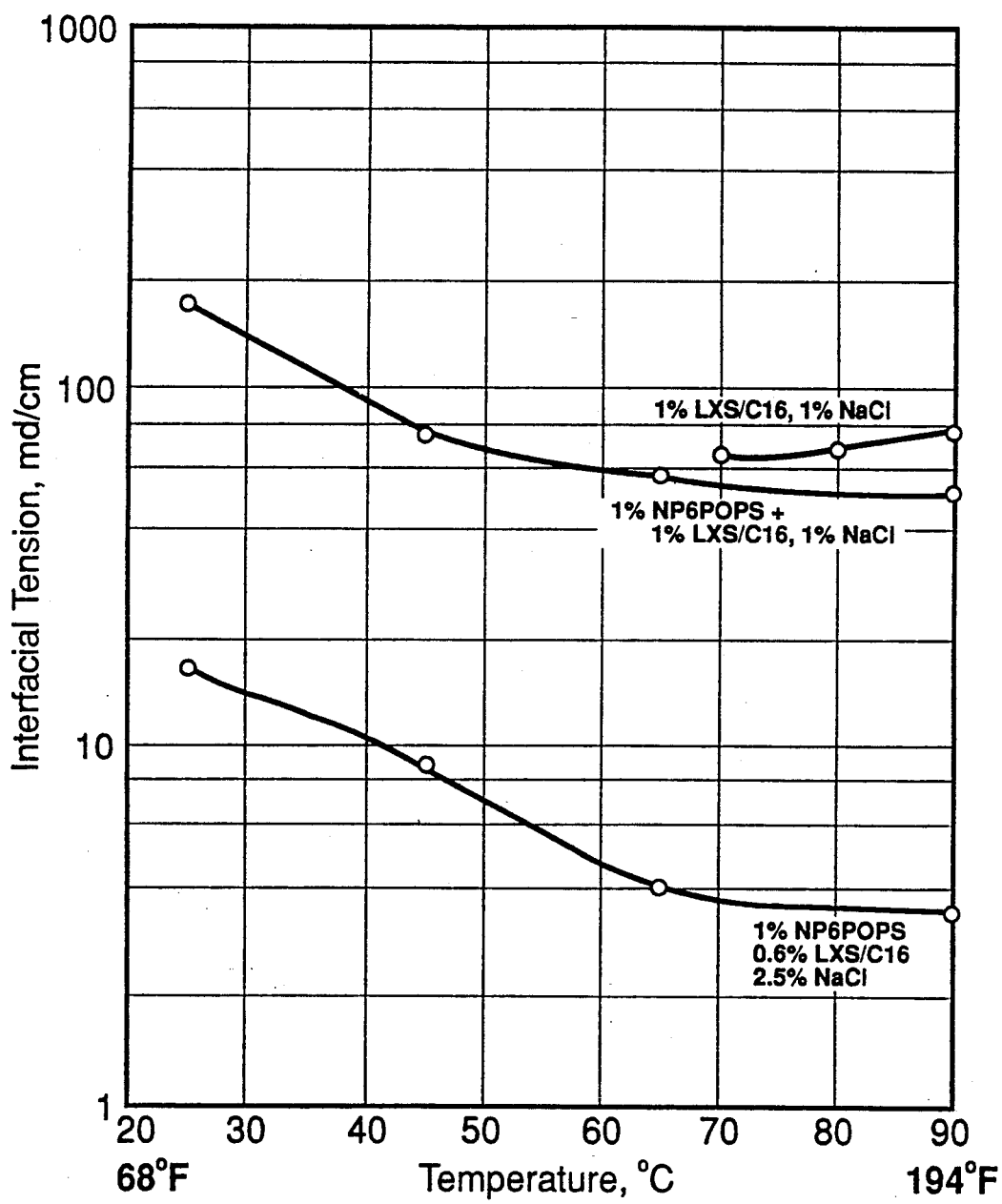
FIG. 1 is a graph illustrating the effective of temperature on interfacial tension for several surfactant systems containing an alkoxylated surfactant useful for the invention method.

The problems that make surfactant flooding of heavy oil reservoirs so difficult such as heavy, viscous oil, low salinity and high temperature can be overcome even though a large hydrophobe surfactant is required with water injection. The solution is to use surfactants that exhibit a cloud point below the reservoir temperature but above ambient injection temperature. Such surfactants, notably alkoxylated ionics and nonionics are soluble in water up to their cloud point temperature.

Ordinarily, the solubility of most compounds increases with increasing temperature. But many alkoxylated surfactants have their solubility completely changed from water to oil solubility at their cloud point temperature. In the presence of an oil, this characteristic may be called the phase inversion temperature. Above the cloud point, these alkoxylated surfactants are oil soluble; below the cloud point, they are water soluble. This phenomenon is so drastic that a water-in-oil microemulsion will change to an oil-in-water microemulsion after passing the cloud point temperature.

Thus, alkoxylate based surfactant systems will be water soluble and phase stable at ambient surface temperature. After injection and subsequent temperature increase above their cloud point due to a higher formation temperature, the alkoxylate surfactant systems will become oil soluble. Further, they can be designed with large hydrophobes to solubilize high EACN oils such as the heavy oils found in California while being balanced with a long alkoxylate chain that will give water solubility below their cloud point. The invention method takes advantage of this unusual chemical behavior and flies counter to traditional thinking of alkoxylated surfactants as water soluble surfactants and the last possibility that would occur to an enhanced oil recovery chemist for flooding heavy oils.

The invention is a method of recovering heavy oil from an underground reservoir by surfactant flooding, which comprises injecting an aqueous surfactant solution comprising about 0.1% to about 5%, preferably about 0.2% to about 2% by weight of an alkoxylated nonionic or ionic surfactant through an injection well into an underground reservoir. Other surfactants may be employed in the system such as oil soluble surfactants. Ideally the surfactant solution composition, concentration and salinity is balanced so that the surfactant solution and reservoir oil will emulsify in a Type III phase regime middle phase.

The reservoir must contain a heavy oil having an average API gravity below about 20° and a reservoir temperature above about 150° F. An aqueous drive fluid is injected through the injection well into the reservoir after the surfactant solution to drive the surfactant solution towards a production well. Finally, oil is recovered with other fluids through one or more production wells.

The alkoxylated surfactant must have sufficient ethylene oxide groups, propylene oxide groups, or both ethylene oxide and propylene oxide groups to have a cloud point above about 100° F. and below reservoir temperature, and to be water soluble in the surfactant solution to be injected at a temperature below its cloud point. The alkoxylated surfactant must also have a sufficiently high large hydrophobe to be soluble in the reservoir's heavy oil at a temperature equal to or greater than reservoir temperature.

Although it is most applicable to steamflooded heavy oil reservoirs, the invention method may be used to surfactant flood any oil reservoirs as long as the reservoir temperature is higher than about 150° F. Many Gulf Coast formations have reservoir temperatures above 150° F., but do not necessarily contain heavy oils, defined herein as oils with an API gravity less than about 20°. The key is to have a formation temperature sufficiently higher than ambient surface temperature and sufficiently higher than the cloud point of the alkoxylate surfactant system. Theoretically the temperature difference between reservoir temperature and cloud point or ambient temperature and cloud point could be a couple of degrees because the cloud point is very precise. But in field practice, mixing, temperature control, and some separation that will inevitably occur upon injection into the formation means that it is advantageous to have a cushion of multiple degrees, preferably 10° F. or more on each side of the cloud point temperature.

The reservoir temperature of the vast Kern River formation in California ranges from a minimum of about 200° F. to about 450° F. in active steamflooding areas. In such a steamflooded reservoir, the only areas cooler than about 200° F. would be cold oil areas that have had no contact with steam over the years. The method would not work for these cold oil areas unless the temperature of the cold oil areas was above the cloud point of the surfactant system to enable the alkoxylate to change to an oil soluble surfactant.

High formation temperatures impose an additional restriction on the surfactants in the system. The surfactants must be hydrolytically stable at those temperatures. This makes certain sulfonates and carboxylates desirable surfactants.

The invention method may be employed at more stringent reservoir conditions that work against optimum surfactant flooding besides those mentioned above. For instance, the surfactant system can be adjusted to give outstanding recoveries where the reservoir oil is so thick that it has an average API gravity below about 16°, or even below about 14° such as in the Kern River reservoir. A higher reservoir temperature such as 175° F. or 225° F. does not inhibit the practice of the invention except for the additional demands of thermal stability placed upon the surfactants. Extremely fresh formation brine below 1500 ppm TDS or even below about 900 ppm TDS such as in Kern River can be tolerated.

Reservoir temperatures make the invention method a hot surfactant flood. Injection must take place below the cloud point temperature of the alkoxylate. This may or may not be at a hot water temperature. However, the required reservoir temperature will quickly heat up any injected solution to a hot water temperature.

It is also possible to coinject the invention surfactant slug with steam, wherein the alkoxylated surfactant is solvated in the liquid fraction of the injected steam. The surfactant will sink with the hot steam condensate towards the bottom of the reservoir and aid in sweeping oil there at the same time steam sweeps other portions of the formation. But the coinjection of the surfactant system with steam may add problems of surfactant and polymer hydrolytic stability at the higher temperatures associated with steam injection.

In systems with a large hydrophobe nonalkoxylated surfactant, it is true that the amount of salt required for optimum behavior will generally increase with additional alkoxylate surfactant in the system. However, this salinity shift need not be large since the higher temperatures will greatly compensate by reducing the alkoxylate surfactant's water solubility. There is a practical trade-off between low temperature solution stability and a small amount of additional salt. With a judicious choice of alkoxylated surfactant, added salinity may not even be necessary.

Aqueous drive fluids known in the art may be employed assuming they are compatible with the specific surfactant system. Some drive systems are not compatible with some surfactant systems and lower recovery efficiency. Corefloods may be performed to check compatibility. Preferred drive fluids are aqueous polymer solutions including polyacrylamides, modified polyacrylamides or copolyers of polyacrylamides. Polysaccharides are unlikely to be satisfactory because of the elevated reservoir temperatures involved.

Although a large number of alkoxylated surfactants may be employed in the invention method, a preferred alkoxylated surfactant is an alkoxylated alkylaryl sulfonate having an alkyl chain with about 6 to about 20 carbon atoms and an alkoxylate chain of about 3 to about 20 ethylene oxide groups, propylene oxide groups or a mixture of ethylene oxide and propylene oxide groups. More preferably, this group of surfactants will have an alkyl chain of about 7 to about 12 carbon atoms and an alkoxylate chain of about 5 to about 15 alkoxylate groups.

Another preferred group of alkoxylated surfactants is an alkoxylated alkanol sulfate with about 12 to about 20 carbon atoms in the alkanol chain and alkoxylate chain of about 7 to about 14 ethylene oxide groups, propylene oxide groups or mixture of ethylene oxide and propylene oxide groups.

FIG. 1 illustrates several advantageous systems for practicing the invention method. One employs LXS/C16, a trademarked linear xylene sulfonate having a 16 carbon alkyl chain sold by Shell Chemical Co., along with the alkoxylated surfactant NP6POPS, a trademarked nonylphenol propane sulfonate having an average of 6 moles of propylene oxide manufactured by Texaco Chemical Co. The LXS/C16 xylene sulfonate was phase unstable at salinities above 1% NaCl. This salinity is where optimal performance was obtained, but the surfactant had to be preheated before coreflooding. The solution of 1% NP6POPS plus 0.6% LXS/C16 was still translucent (soluble and stable) at 2.5% NaCl even at room temperature. The alkoxylated system also gave lower interfacial tensions (IFT) than the LXS/C16 alone and was indicating IFT improvement even beyond the temperature limits of the measuring instruments. The NP6POPS was used in the studies because it has a high hydrophobic character. Similar results were obtained with a nonylphenol sulfonate with an average 6 moles of ethylene oxide sold by Diamond Shamrock under the trademark NES96. These advantages can be realized with most alkoxylated surfactants, whether they are anionic or nonionic, as long as they have enough alkoxylate groups to exhibit a change in behavior as a function of passing the cloud point temperature.

The following examples further illustrate the novel surfactant system method of the invention. These examples are given by way of illustration and not as limitations on the scope of the invention. Thus, it should be understood that the steps and materials employed in the instant may be varied to achieve similar results within the scope of the invention.

EXAMPLES 1-9

Table 1 lists the cloud points for several alkoxylated surfactants at specified salinity levels. These surfactants are excellent candidates for use with the invention method. TA-6PO20PS is a trademarked alkoxylated tallow alcohol propane sulfate having an average of 6 propylene oxide groups and 2 ethylene oxide groups sold by Texaco Chemical Company. TA-6PO30PS is a trademarked tallow alcohol propane sulfate having an average of 6 propylene oxide groups and 3 ethylene oxide groups sold by Texaco Chemical Company. The Surfonic surfactants of Examples 6-9 are all trademarked nonylphenol sulfonates having an average of 8.5, 9.5, 12 and 15 ethylene oxide groups respectively sold by Texaco Chemical Company. All cloud points were determined by making 2.0% by weight aqueous solutions in the specified brine and heating the solutions until they became opaque at the cloud point.

TABLE 1
ALKOXYLATED SURFACTANT CLOUD POINTS

| EXAMPLES | SURFACTANT | BRINE[1] | CLOUD POINT |
|---|---|---|---|
| 1 | NP6POPS | K.R. + 1% NaCl | >100° C. |
| 2 | NP6POPS | K.R. + 2% NaCl | 65° C. (149° F.) |
| 3 | NP6POPS | K.R. + 3% NaCl | 40° C. (104° F.) |
| 4 | TA-6PO20PS | 2% NaCl | 63° C. (145° F.) |
| 5 | TA-6PO30PS | K.R. + 6% NaCl | 42° C. (108°) |
| 6 | Surfonic N85 | K.R. + 1% NaCl | 37° C. (99° F.) |
| 7 | Surfonic N95 | K.R. + 1% NaCl | 47° C. (117° F.) |
| 8 | Surfonic N120 | K.R. + 1% NaCl | 73° C. (163° F.) |
| 9 | Surfonic N150 | K.R. + 1% NaCl | 90° C. (194° F.) |

[1]K.R. is abbreviation for synthetic Kern River produced water having a salinity of 850 ppm TDS with 35 ppm divalent ions.

EXAMPLE 10

An invention coreflood was performed simulating a Kern River formation flood in an epoxy-coated Berea sandstone core which measured 1.5 inches in diameter by 12 inches long. The dry core was saturated with multiple volumes of a simulated Kern River water having 850 ppm TDS with 35 ppm divalent ions prepared in deionized water. The core temperature was raised to 121° C. (250° F.) and maintained at that temperature for the remainder of the coreflood. Core saturation was decreased to an irreducible water saturation with a Kern River crude having an API gravity of about 13.6°. The core was then waterflooded with the same water to an irreducible oil saturation of 36%.

A surfactant system was prepared containing 1% by weight of the Shell LSX/C16 and 0.6% by weight of the NP6POPS. The surfactant system was stable when stored at 25° C.

0.3 pore volumes of the surfactant system were injected at 121° C. (250° F.), which is above the cloud point of the alkoxylated surfactant. The slug was followed by an aqueous polymer drive containing 200 ppm of Lubrizol 2420 in the same water that had been softened. Lubrizol 2420 is a trademarked 2-acrylamido-2-methylpropane sulfonate (AMPS) sold by Lubrizol Inc. having an average equivalent weight of about 10 to 15 million.

This coreflood according to the invention method gave an astounding 83.3% recovery efficiency of the remaining crude in the core, reducing oil saturation below 6%.

The method of the present invention can be subject to many modifications and changes by those skilled in the art without departing from the concepts of the present invention. Accordingly, it should be clearly understood that the concepts disclosed in the description are illustrative only, and are not intended as limitations on the scope of the invention.

What is claimed is:

1. A method of recovering heavy oil from an underground reservoir by surfactant flooding, which comprises:

injecting an aqueous surfactant solution comprising about 0.1% to about 5% by weight of an alkoxylated nonionic or ionic surfactant through an injection well into an underground reservoir containing a heavy oil having an average API gravity below about 20° and a reservoir temperature above about 150° F., said alkoxylated surfactant having sufficient ethylene oxide groups, propylene oxide groups, or both ethylene oxide and propylene oxide groups to have a cloud point above about 100° F. and below reservoir temperature, and to be water soluble in the surfactant solution to be injected at a temperature below its cloud point, said alkoxylated surfactant having a sufficiently large hydrophobe to be soluble in the reservoir's heavy oil at a temperature equal to or greater than reservoir temperature;

injecting an aqueous drive fluid through the injection well into the reservoir after the surfactant solution to drive the surfactant solution towards a production well; and recovering the oil and other fluids through a production well.

2. The method of claim 1, wherein the reservoir oil has an average API gravity below about 16°.

3. The method of claim 1, wherein the reservoir temperature is above about 175° F.

4. The method of claim 1, wherein the reservoir has a salinity below about 1500 ppm TDS.

5. The method of claim 1, wherein the reservoir has been steamflooded.

6. The method of claim 1, wherein the surfactant solution further comprises an oil soluble sulfonate surfactant.

7. The method of claim 1, wherein about 0.05 to about 0.6 pore volumes of surfactant solution is injected into the reservoir.

8. The method of claim 1, wherein the drive fluid is an aqueous polymer solution.

9. The method of claim 8, wherein the polymer is polyacrylamide, modified polyacrylamide or copolymer of polyacrylamide.

10. The method of claim 1, wherein the surfactant solution composition, concentration and salinity is balanced so that the surfactant solution and the reservoir oil will emulsify in a Type III phase regime middle phase.

11. The method of claim 1, wherein the alkoxylated surfactant is an alkoxylated alkylaryl sulfonate having an alkyl chain with about 6 to about 20 carbon atoms and an alkoxylate chain of about 3 to about 20 ethylene oxide groups, propylene oxide groups, or a mixture of ethylene oxide and propylene oxide groups.

12. The method of claim 11, wherein the alkoxylated surfactant has an alkyl chain of about 7 to about 12 carbon atoms, and an alkoxylate chain of about 5 to about 15 alkoxylate groups.

13. The method of claim 1, wherein the alkoxylated surfactant is an alkoxylated alkanol sulfate with about 12 to about 20 carbon atoms in the alkanol chain and an alkoxylate chain of about 7 to about 14 ethylene oxide groups, propylene oxide groups, or mixture of ethylene oxide and propylene oxide groups.

14. The method of claim 1, further comprising coinjecting steam with the alkoxylated surfactant solution.

15. A method of recovering heavy oil from an underground reservoir by hot water surfactant flooding, which comprises:

injecting about 0.05 to about 0.6 pore volumes of an aqueous surfactant solution comprising about 0.1% to about 5% by weight of an alkoxylated nonionic or ionic surfactant through an injection well into an underground reservoir that has been steamflooded containing a heavy oil having an average API gravity below about 16°, a reservoir temperature above about 175° F., and a salinity less than about 1500 ppm TDS, said alkoxylated surfactant having sufficient ethylene oxide groups, propylene oxide groups, or both ethylene oxide and propylene oxide groups to have a cloud point above about 100° F. and below reservoir temperature, and to be water soluble in the surfactant solution to be injected at a temperature below its cloud point, said alkoxylated surfactant having a sufficiently large hydrophobe to be soluble in the reservoir's heavy oil at a temperature equal to or greater than reservoir temperature;

injecting an aqueous drive fluid through the injection well into the reservoir after the surfactant solution to drive the surfactant solution towards a production well; and recovering the oil and other fluids through a production well.

* * * * *